(12) United States Patent
Kadambi et al.

(10) Patent No.: US 7,853,617 B2
(45) Date of Patent: Dec. 14, 2010

(54) METHOD AND SYSTEM TO ENABLE DYNAMIC MODIFICATION OF METADATA IN CONTENT

(75) Inventors: Jayant Kadambi, Mountain View, CA (US); Ayyappan Sankaran, San Jose, CA (US); Yogesh Dandekar, Fremont, CA (US); Vijay Kaushik, Fremont, CA (US); Murali Shankar, San Jose, CA (US)

(73) Assignee: Yume, Inc., Redwood City, CA (US)

( * ) Notice: Subject to any disclaimer, the term of this patent is extended or adjusted under 35 U.S.C. 154(b) by 0 days.

(21) Appl. No.: 12/723,657

(22) Filed: Mar. 14, 2010

(65) Prior Publication Data

US 2010/0174781 A1   Jul. 8, 2010

Related U.S. Application Data

(63) Continuation of application No. 11/433,456, filed on May 15, 2006, now Pat. No. 7,716,248.

(60) Provisional application No. 60/682,244, filed on May 18, 2005.

(51) Int. Cl.
*G06F 17/30* (2006.01)
(52) U.S. Cl. .................................................. 707/793
(58) Field of Classification Search ................. 707/793
See application file for complete search history.

(56) References Cited

U.S. PATENT DOCUMENTS

| | | | |
|---|---|---|---|
| 5,550,900 A | 8/1996 | Ensor et al. | 379/88.11 |
| 5,623,537 A | 4/1997 | Ensor et al. | 379/88.2 |
| 5,666,210 A | 9/1997 | Yanai et al. | 358/402 |
| 6,400,996 B1 | 6/2002 | Hoffberg et al. | 700/83 |
| 6,420,687 B1 | 7/2002 | Ozawa et al. | 219/702 |
| 6,631,351 B1 | 10/2003 | Ramachandran et al. | 704/270 |
| 6,772,211 B2 | 8/2004 | Lu et al. | 709/226 |
| 6,795,404 B2 | 9/2004 | Slemmer et al. | 370/270 |
| 6,889,207 B2 | 5/2005 | Slemmer et al. | 705/54 |
| 6,944,678 B2 | 9/2005 | Lu et al. | 709/245 |
| 7,055,169 B2 | 5/2006 | Delpuch et al. | 725/100 |
| 2002/0108115 A1 | 8/2002 | Palmer | 725/50 |
| 2002/0174438 A1 | 11/2002 | Cleary et al. | 725/100 |
| 2003/0182579 A1 | 9/2003 | Leporini et al. | 713/201 |
| 2003/0191623 A1 | 10/2003 | Salmonsen | 703/24 |
| 2004/0139480 A1 | 7/2004 | Delpuch et al. | 725/135 |
| 2008/0215509 A1 | 9/2008 | Charlton | 706/11 |
| 2008/0247731 A1* | 10/2008 | Yamauchi et al. | 386/95 |

* cited by examiner

*Primary Examiner*—Diane Mizrahi
(74) *Attorney, Agent, or Firm*—Lau & Associates, LLC.

(57) ABSTRACT

A method to enable dynamic modification of metadata in a content, the method comprising of constructing the content (305, 505) received from a plurality of content providers, determining a set of rules based on a criterion (310, 405) and sending the content and the set of rules (315, 410, 510) separately. At a receiver end, the set of rules are applied to the content (610, 710) to obtain a resulting content and the resulting content is displayed (615, 715) on a display unit.

9 Claims, 9 Drawing Sheets

METHOD AND SYSTEM TO ENABLE DYNAMIC MODIFICATION OF METADATA IN CONTENT

This is a continuation of prior U.S. patent application Ser. No. 11/433,456 filed on May 15, 2006 now U.S. Pat. No. 7,716,248 which application claims the benefit of U.S. Provisional Patent Application No. 60/682,244 filed on May 18, 2005.

FIELD OF THE INVENTION

The invention relates generally to dynamically modifying a metadata applied to a content. More specifically to a method and system to enable dynamic modification of a metadata in a content. The content can comprise of a movie, a video, a viewable online content and a non-movie content that includes a TV serial, a documentary, and a game.

BACKGROUND OF THE INVENTION AND PRIOR ART

In today's scenario there are different ways in which one can watch movies, videos and any online content. One goes to the video store for rentals of movies or videos, the content of which is stored on movie or video films or on digital video disks (DVDs). One also downloads or streams content on a personal computer (PC) from the Internet. It is also possible that Quarter Common Intermediate Format (QCIF), and other small-screen streams or broadcast TV quality can be viewed using the PC. However many times such downloaded or streamed content is low quality.

In addition, all the above-mentioned video formats consist of static content, where the content and metadata are embedded during authoring the content. The content therefore needs to be completely re-authored if any changes to the metadata are required during playback. As a result it becomes cumbersome and costly since a change in content or metadata involves re-authoring, and reconstructing the content. Therefore, there exists a need to provide a method to enable dynamic modification of metadata if any changes to the content are required during playback.

SUMMARY OF THE INVENTION

An aspect of the invention is to provide a method and system to enable dynamic modification of a metadata in a content.

In order to fulfill above aspect, the method comprises constructing a content. Thereafter, determining a first set of rules for the content based on a criterion. Further, the method comprises sending the set of rules and the content to a receiver to enable the receiver to apply the set of rules to the content. It should be observed that the content can comprise a movie, a video, a viewable online content and a non-movie content that may include a TV serial, a documentary, and a game. Typically, the content can be a single file or a set of multiple files. The set of rules being applied to the content can comprise a plurality of advertisements, a plurality of subtitles, a plurality of holograms and a plurality of censor rules. The criteria based on which the set of rules are determined can comprise a region to which the content is transmitted and a viewing pattern of a viewer.

BRIEF DESCRIPTION OF THE DIAGRAMS

The accompanying figures together with the detailed description below are incorporated in and form part of the specification, serve to further illustrate various embodiments and to explain various principles and advantages all in accordance with the invention, and should not be construed to limit the invention.

DETAILED DESCRIPTION

Figure 1:
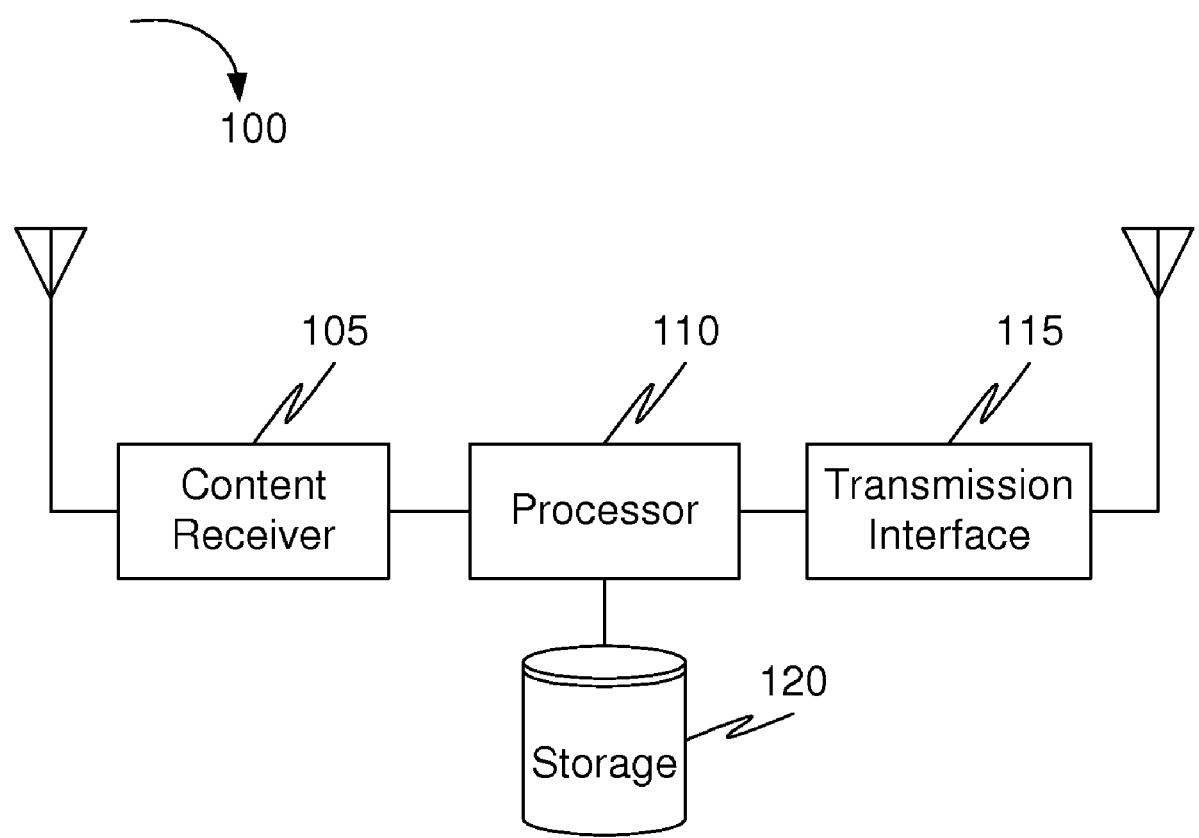
FIG. 1 shows a system for dynamic modification of a metadata in a content at a transmitter end, in accordance with an exemplary embodiment of the invention.

It is believed that this invention will be better understood from a consideration of the following description in conjunction with the drawing figures, in which like reference numerals are carried forward.

As required, detailed embodiments of the invention are disclosed herein; however, it is to be understood that the disclosed embodiments are merely exemplary of the invention, which can be embodied in various forms. Therefore, specific structural and functional details disclosed herein are not to be interpreted as limiting, but merely as a representative basis for teaching one skilled in the art to variously employ the invention in virtually any appropriately detailed structure. Further, the terms and phrases used herein are not intended to be limiting but rather to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The invention relates generally to dynamically modifying a metadata in relation to a content. Pursuant to the various embodiments, the invention provides a method and a system to enable dynamic modification of a metadata in the content. The content can comprise a movie, a video, a viewable online content and a non-movie content that may include a TV serial, a documentary, and a game. Typically, the content can be a single file or a set of multiple files. The set of rules applied to the content can comprise a plurality of advertisements, a plurality of subtitles, a plurality of holograms and a plurality of censor rules. These set of rules are based on certain criteria, such criterion can comprise a region to which the content is transmitted and a viewing pattern of a viewer. In various embodiments of the invention, the metadata is sent separately from the content. This facilitates changing the metadata and sending such modified metadata to a receiver for applying it to the content that has already been sent.

FIG. 1 shows a system 100 for dynamic modification of a metadata in a content at a transmitter end, in accordance with an exemplary embodiment of the invention. System 100 at the transmitter end comprises a content receiver 105 that receives the content from a content provider. The content provider can be, for example, a video production house or a film production house or a site management company or a television channel that owns the rights for a distribution of the content. However the content provider may not be an external entity, but such content may be owned or produced in-house. A processor 110 at the transmitter end determines a set of rules to be applied to the content. The content can be the same content or a different content to which the same set of rules or a different set of rules can be applied. Consider a scenario wherein a movie is to be played in different locations. The movie has first set of rules (for example advertisements, subtitles, holograms) that are applied for first location wherein the set of rules are local/confined to first location and for the same movie a second set of rules (for example advertisements, subtitles, holograms) are applied for a second location wherein the second set of rules are local/confined to second location. Thereby reducing the process of re-authoring the movie for both the first location and the second location As, only the rules to be applied for the first location and the second location are different, it is only required to apply a different set of rules to the movie. In an embodiment of the invention, processor 110 can also be responsible for storing the content at the transmitter end in a storage 120, depending on an arrangement with the content provider i.e. the arrangement may contemplate a one time payment for obtaining the content from the content provider. A transmission interface 115 transmits the content and the set of rules separately to a receiver. In an embodiment of the invention, transmitter interface 115 transmits only the set of rules to the receiver. It will be appreciated that the functionality at the transmitter end as mentioned herein is not exhaustive and could be implemented by various other methods.

Figure 2:
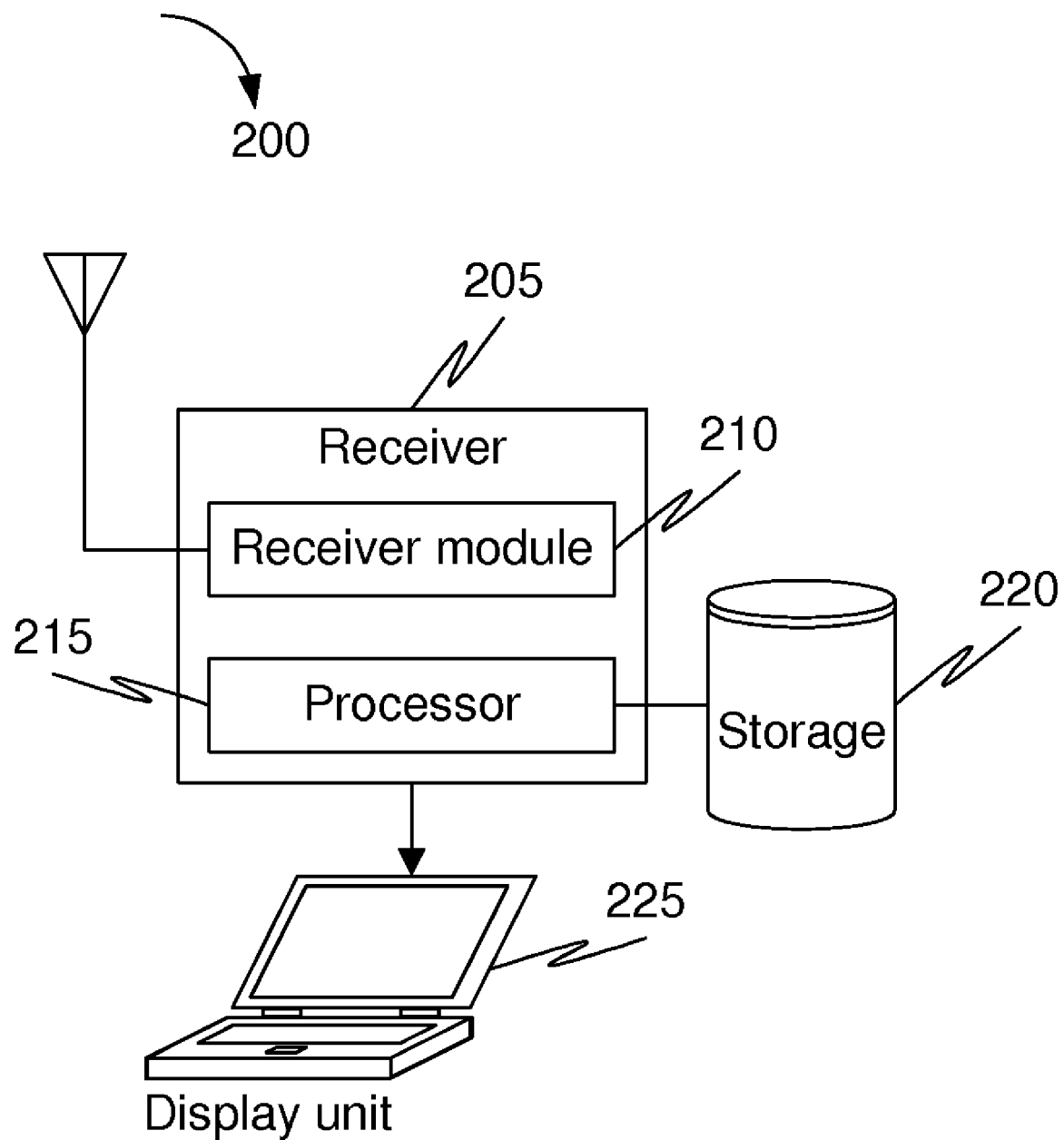
FIG. 2 shows a system for dynamic modification of a metadata in acontent at a receiver end, in accordance with an exemplary embodiment of the invention.

FIG. 2 shows a system 200 for dynamic modification of a metadata in a content at a receiver end, in accordance with an exemplary embodiment of the invention. System 200 at the receiver end comprises a receiver 205. Receiver 205 can be, for example, a set top box that can be installed at a user location in order to view the content. Receiver 205 comprises a receiver module 210 that receives the content, for example a movie, and a set of rules such as a plurality of advertisements, a plurality of subtitles and a plurality of holograms to be applied to the content, from a transmitter end. Receiver 205 further comprises a processor 215. Processor 215 applies the set of rules to the content that are received by receiver module 210 to produce a resulting content that can be stored in a storage 220. Since the content and the set of rules are stored at the receiver end, the transmitter end may not transmit the content again when it transmits a different set of rules to the receiver end. Processor 215 then sends the resulting content that is stored in storage 220 to a display unit 225. In an exemplary embodiment of the invention display unit 225 can be, for example, a television set, a DVD player and a personal computer.

Figure 3:
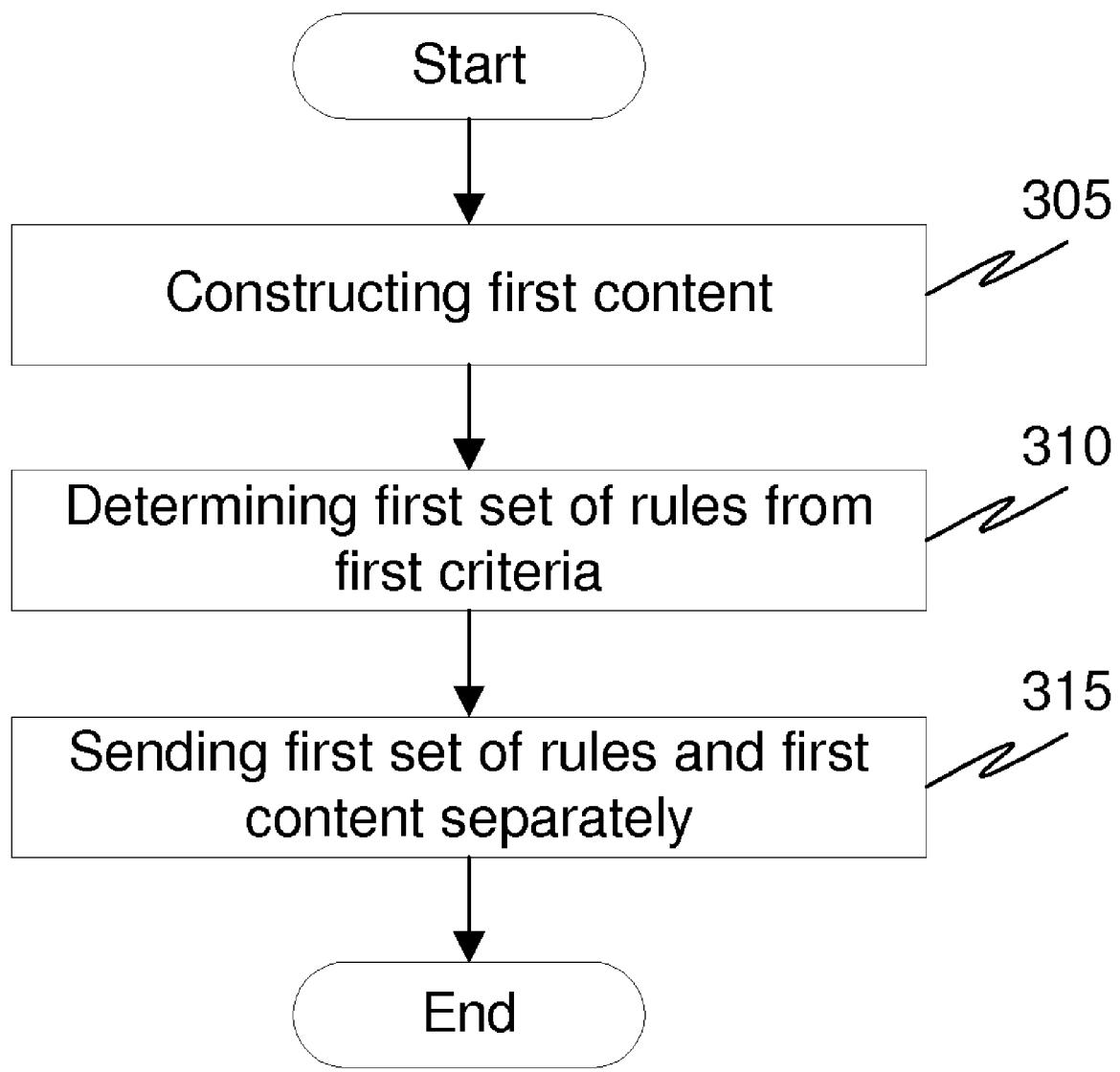
FIG. 3 is a flow diagram of a method for enabling dynamic modification of a metadata in a first content at a transmitter end based on a first set of rules, in accordance with an embodiment of the invention.

In this document, relational terms such as first and second, and the like have been used solely to distinguish one entity or action from another entity or action without necessarily requiring or implying any actual such relationship or order between such entities or actions. Turning now to FIG. 3 a flow diagram of a method for enabling dynamic modification of a metadata in a first content at a transmitter end based on a first set of rules, in accordance with an embodiment of the invention. At step 305, a first content is constructed from a content provider. Those skilled in the art shall realize that the first content can be a single file or a set of multiple files. As explained earlier, the content provider can be, for example, a production house, a movie channel, a music company and a content owner. Further, the content can also be owned and produced in-house. At step 310, upon receiving the first content, a processor determines a first set of rules based on a first criterion. In an embodiment of the invention, the first set of rules is a metadata that can be dynamically combined with the first content at a receiver end. As explained earlier, the metadata can include a plurality of advertisements, or a plurality of subtitles, or a plurality of censor rules that can be dynamically combined with the content at the receiver end. The first criterion can comprise a geography of a place, a plurality of censor rules and a plurality of viewing patterns of a user that are observed over a period of time. Thereafter, as depicted in step 315, the first content and the first set of rules are sent separately to a receiver module.

The dynamic modification of a first content at the receiver end is enabled due to sending a first content and a first set of rules separately to the receiver end. This enables further, sending only a second set of rules to the receiver end to be applied to the first content.

Figure 4:
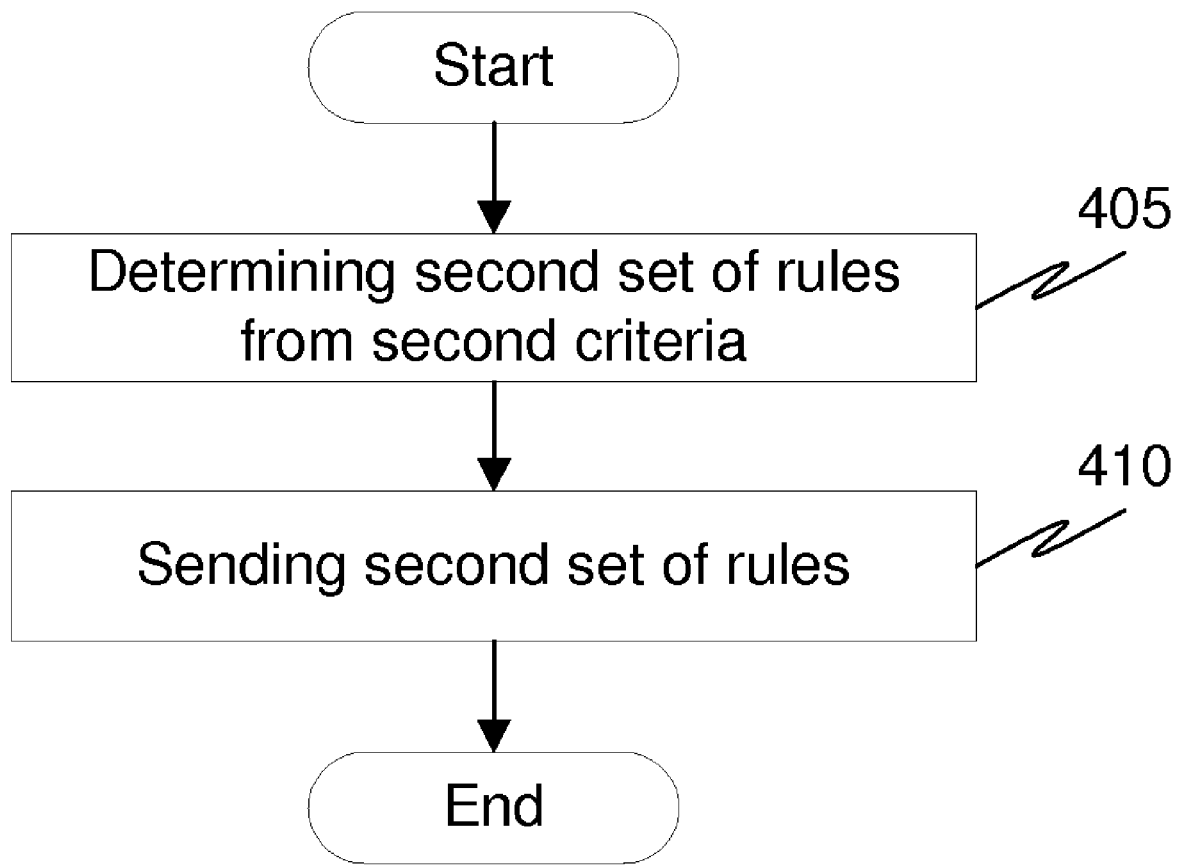
FIG. 4 is a flow diagram of a method for enabling dynamic modification of a metadata in a first content at a transmitter end based on a second set of rules, in accordance with an embodiment of the invention.

FIG. 4 shows a flow diagram of a method for enabling dynamic modification of a metadata in a first content at a transmitter end based on a second set of rules, in accordance with an embodiment of the invention. At step 405, a second set of rules are determined based on a second criterion in order to enable applying the second set of rules to the first content that has already been sent to the receiver end. The second set of rules are different from the first set of rules that have been sent to the receiver end, and are determined based on a second criterion, different from a first criterion. Therefore, the second set of rules can include a different set of advertisements, or subtitles or censor rules. At step 410, the second set of rules are sent to the receiver. In an embodiment of the invention, for example, the first criterion or the second criterion comprise a geography of a place, a plurality of censor rules and a plurality of viewing patterns of a user that are observed over a period of time.

In an embodiment of the invention the second set of rules can be merely rearranging an order of advertisement or a slot of advertisement, the information of which is already sent while sending the first set of rules. So, the second set of rules may not comprise the advertisements the receiver module has already received and stored along with the first content and the first set of rules. This would further increase the efficiency by avoiding resending the advertisement along with the second set of rules.

Figure 5:
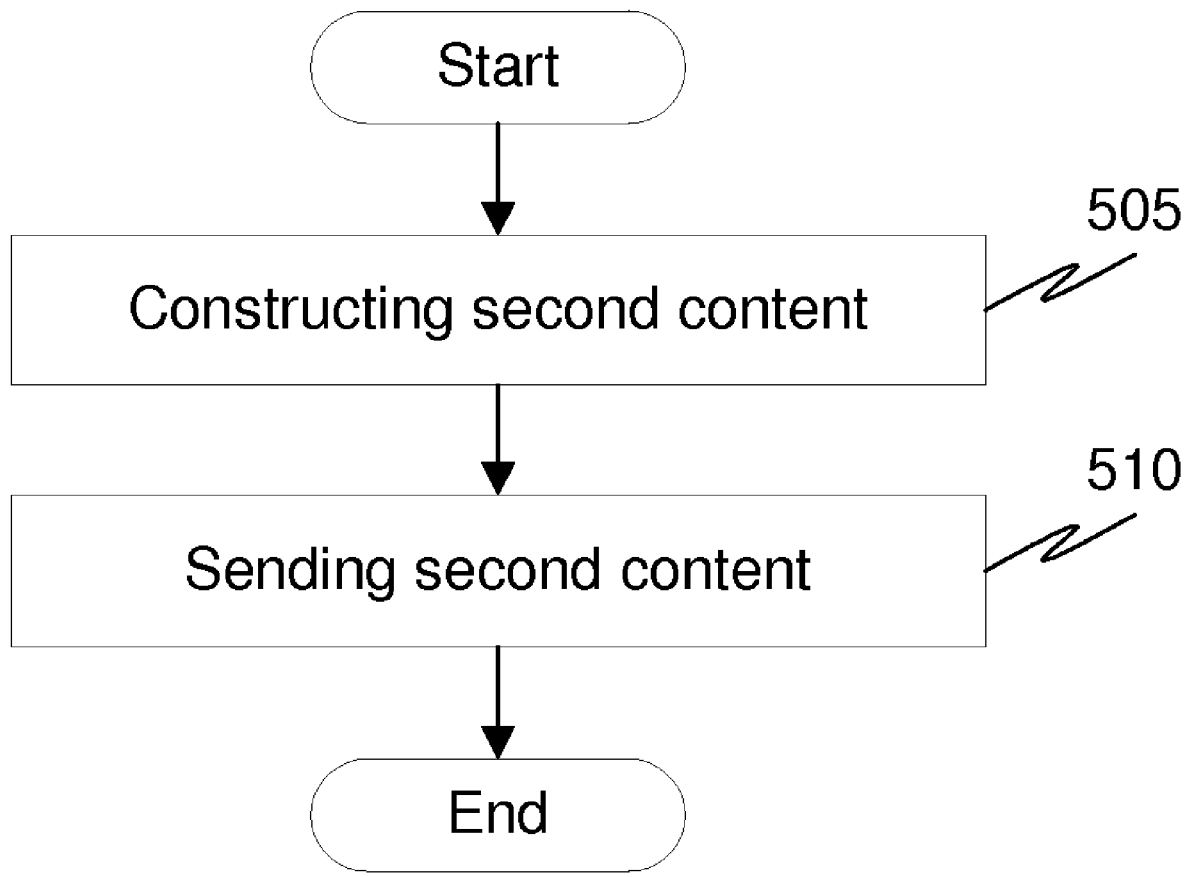
FIG. 5 is a flow diagram of a method for constructing a second content for enabling dynamic modification of a metadata based on either a first set of rules or a second set of rules at a transmitter end, in accordance with an embodiment of the invention.

As it has been stated earlier that the content can be the same content or a different content to which the same set of rules or a different set of rules can be applied. FIG. 5 is a flow diagram of a method for constructing a second content for enabling dynamic modification of a metadata based on either a first set of rules or a second set of rules at a transmitter end, in accordance with an embodiment of the invention. Those skilled in the art shall realize that the second content can be a single file or a set of multiple files. At step 505, the second content is constructed. At step 510, the second content is sent to receiver module. To the second content, either the first set of rules or the second set of rules that have been sent earlier to the receiver module can be applied at processor. The second content can be different from the first content.

On receiving the first content and the first set of rules at receiver module, processor applies the first set of rules to the first content to form a first resulting content and thereafter displays the first resulting content on display unit.

Figure 6:
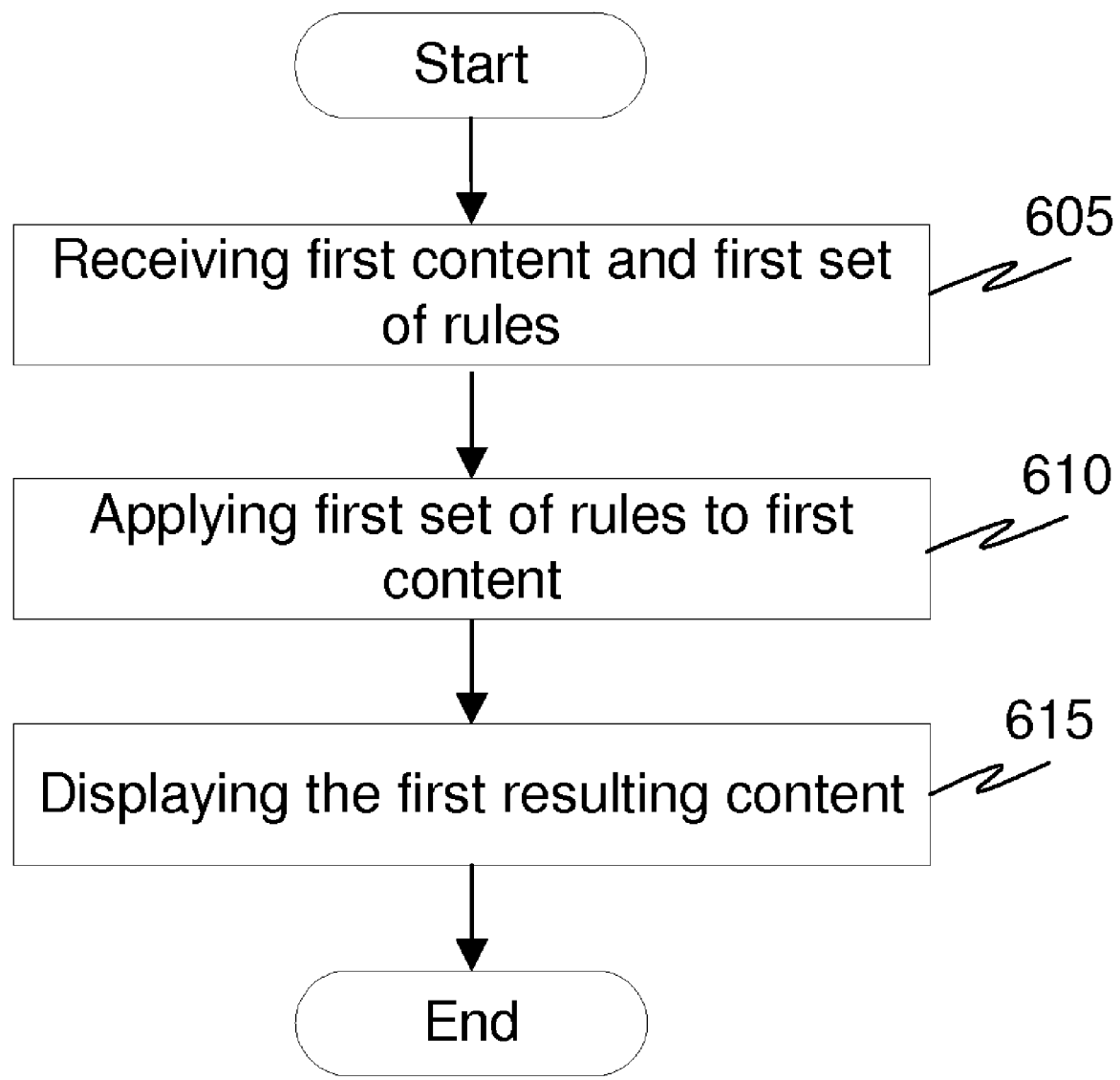
FIG. 6 is flow diagram of a method for enabling dynamic modification of a metadata in a content at a receiver end based on a first set of rules, in accordance with an embodiment of the invention.

FIG. 6 is a flow diagram depicts a method to enable dynamic modification of a metadata in a first content at a receiver end based on a first set of rules, in accordance with an embodiment of the invention. At step 605, receiver module receives the first content and the first set of rules. The first content and the first set of rules are then stored in storage. At step 610, processor applies the first set of rules to the first content to obtain a first resulting content. The first resulting content is the content merged with the metadata that has been received at the receiver end. At step 615, the resulting content is then sent to the display unit for displaying it. The content may be viewed once, or several times, and the viewing may be time-limited, for example, for a week. Further, the rules for viewing the content can be governed by a subscription model. For a customer who subscribes to the subscription model, the rules for viewing the content can be completely customizable based on the preferences of a service provider or a content provider.

Storage stores the first content that can further receive a different set of rules to be applied to the first content and then apply a second set of rules to the first content to obtain a second resulting content. The second resulting content is then displayed on display unit.

Figure 7:
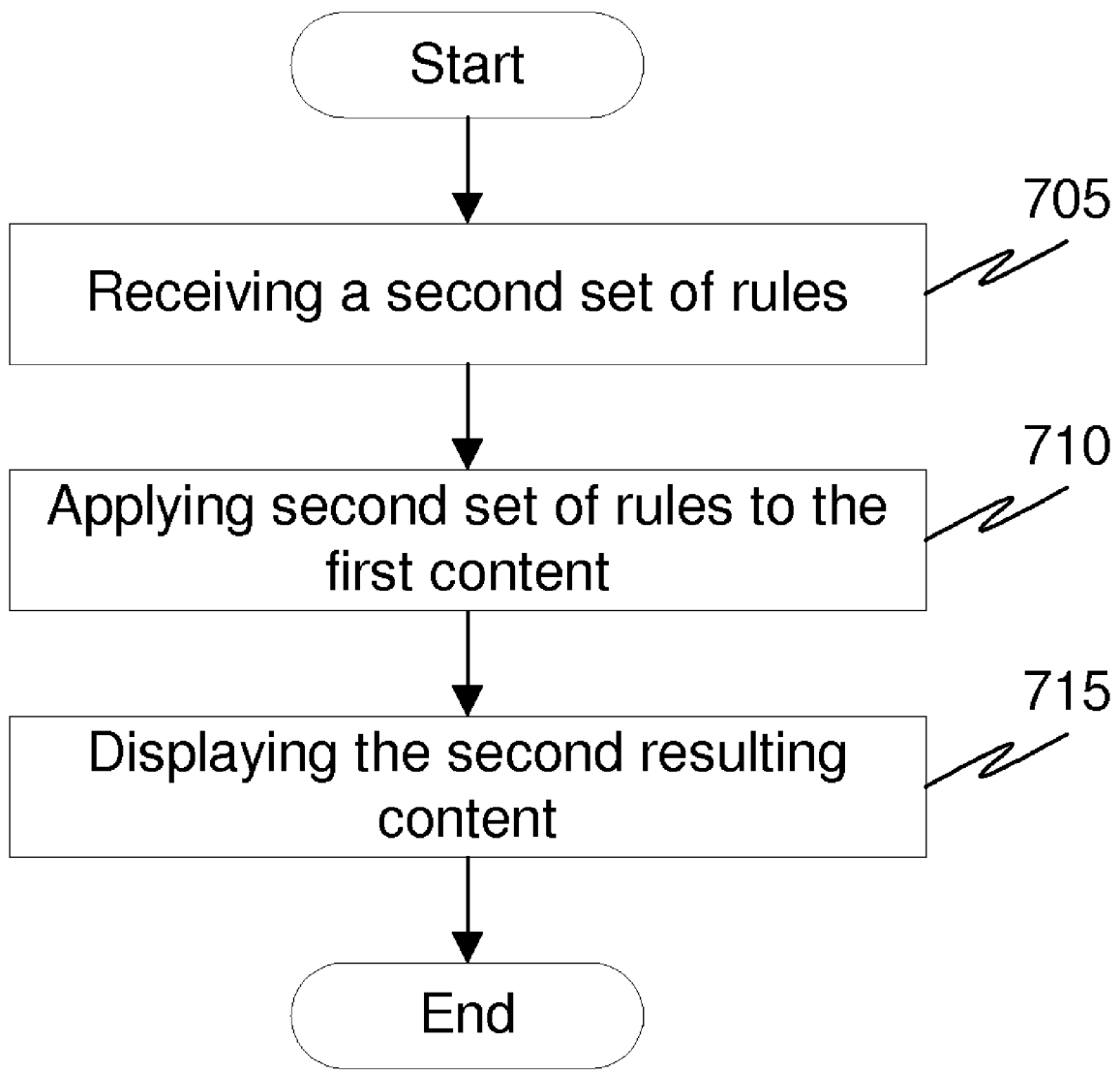
FIG. 7 is a flow diagram of a method for enabling dynamic modification of a metadata in a content at a receiver end based on a second set of rules, in accordance with an embodiment of the invention.

Considering a scenario wherein the content for example a movie that is received by the receiver, to which a set of rules for example advertisement 'A' has been applied, is being viewed in a first location. It is now required to apply a different set of rules for example advertisement B' to the same movie to be viewed in a second location. The reason being that advertisement B' is customized for viewing for the people in the second location. Therefore re-authoring the movie when the set of rules in relation to the movie changes from advertisement 'A' to advertisement B' is not required. Referring now to FIG. 7 a flow diagram for a method for enabling dynamic modification of metadata in the content at a receiver end based on a second set of rules is in accordance with an embodiment of the invention. At step 705, receiver module receives the second set of rules that are determined based on a second criterion. The second set of rules can be a set of advertisements, or subtitles or censor rules or holograms that are different from the first set of rules. The second set of rules are received by the receiver module since the same need to be applied to the first content that has already been received. This reduces the process of re-authoring the entire content in order to display different advertisements or subtitles or censor rules or holograms with the first content. At step 710, processor applies the second set of rules to the first content that is already present in storage. A second resulting content is obtained as a result of applying the second set of rules to the first content. At step 715, the second resulting content is sent to the display unit for displaying it.

In order to enable dynamic modification of metadata, the first set of rules and the first content are sent separately from the transmitter end to the receiver end. Thereafter, the first content is stored at storage and subsequently the second set of rules is sent to receiver module. The first set of rules and the second set of rules are dynamically applied to the first content. Therefore, there is no need for re-authoring the first content when the metadata in relation to the first content changes. The first set of rules and the second set of rules, which denote the metadata, follow a data format that enables dynamic modification of the metadata.

Figure 8:
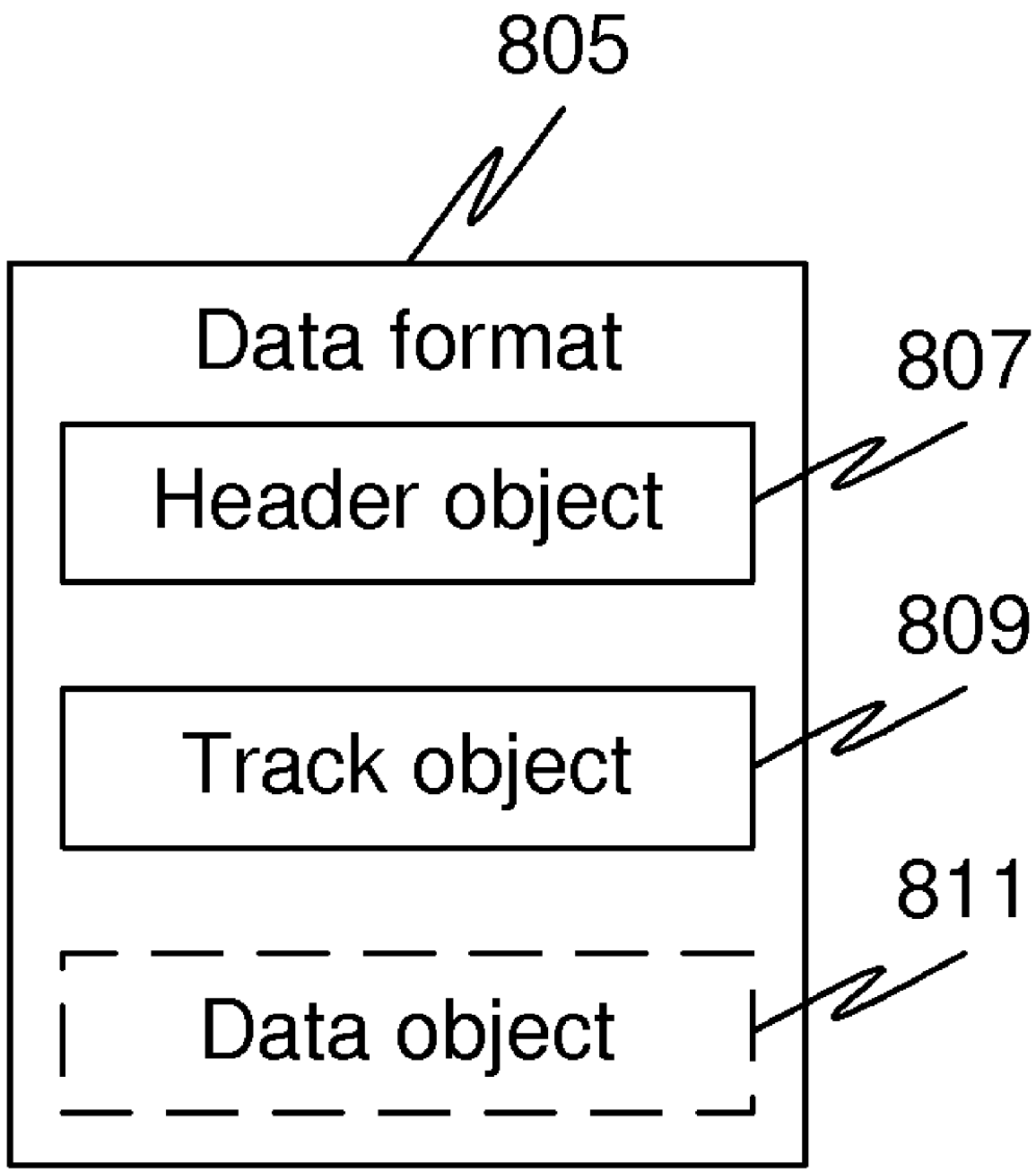
FIG. 8 depicts a data format in relation to a metadata for enabling dynamic modification in the metadata, in accordance with an embodiment of the invention.

FIG. 8 depicts a data format in relation to a metadata for enabling dynamic modification in the metadata, in accordance with an embodiment of the invention. A Data format 805 as depicted is an extensible format to enable structuring of a set of rules designed to store a coordinated digital media data and can also support data playback from a locally stored content or a streamed network playback. Further, data format 805 is independent of a particular digital media composition system, a computer operating system, or a data communications protocol. Data format 805 can include information such as an author, a title, a publication date, a rights information. The structure of data format 805 facilitates a user to stop, fast-forward to a chapter, play only on the songs in a video, and browse and search the content. Additionally, data format 805 can enable addition of other elements that can be useful in a redundant deployment, an advertising and a message insertion, including the ability to provide a text over video overlays during a playback of the content.

Data format 805 comprises a header object 807 and a track object 809. In an embodiment of the invention, data format 805 further comprises a data object 811. Header object 807 contains information that is required to interpret an information in track object 809 and data object 811. Track object 809 describes a type of a track. Type of the track can be for example a combination of a video and an audio, or a combination of a video and an audio and a text, or a video, or an audio or a Joint Photographic Experts Group (JPEG), or a text. Data object 811 describes an actual data stream. In an embodiment of the invention, where data object 811 does not form a part of data format 805, data format 805 may point to a location of a data object. The data object may be a separate physical file or a Uniform Resource Locator (URL).

In another embodiment, a partially downloaded data format 805 as shown in FIG. 8 may be functional. Having received the required header object 807 and some complete set of data objects 811, it is possible to seek to any position (backward and forward) within the partially downloaded data format 805. Those skilled in the art, shall appreciate that data format 805 does not require the use of an index object; on the other hand, conventionally implementations require the index in order to gain efficient access to content.

Figure 9:
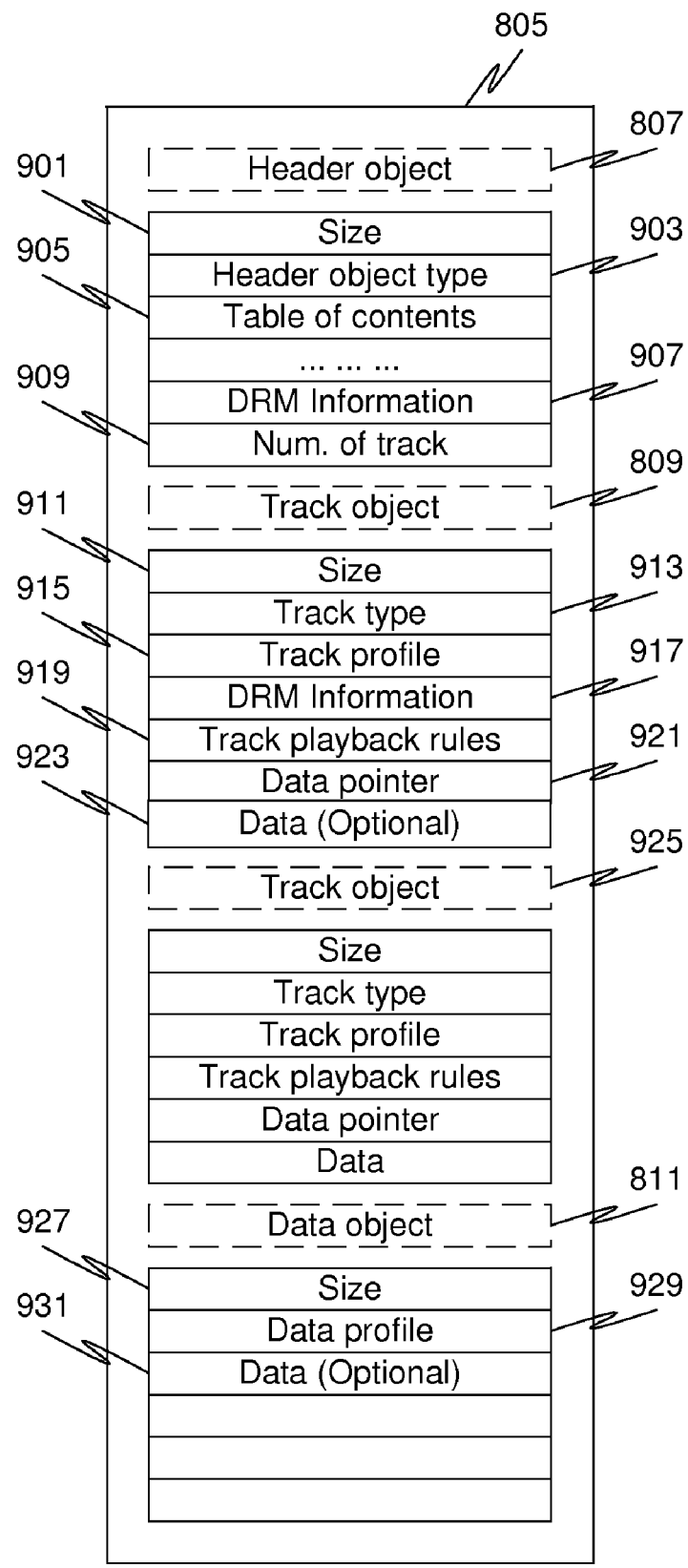
FIG. 9 shows an exploded view of a data format in relation to a metadata for enabling dynamic modification in the metadata, in accordance with an embodiment of the invention.

FIG. 9 shows an exploded view of a data format in relation to a metadata for enabling dynamic modification in the metadata, in accordance with an embodiment of the invention. The exploded view of the data format illustrates various components of data format 805 as shown in FIG. 9. A header object 807 can include a plurality of parameters such as a size 901 of header object 807, a header object type 903, a table of contents 905, a DRM information 907 and a number of tracks object 909.

In an embodiment of the invention, header object type 903 may be a description of a content, denoting a movie, an advertisement, a trailer, a game, a music video, or a music. Table of contents 905 may include a plurality of optional parameters providing a menu navigation, a bibliographic information, and an interactive menu descriptions. DRM Information 907 may include a digital rights information associated with the content. Number of track object 909 can include a total number of tracks present. Header object 807 can include a well-known byte sequence of the data format 805 and can also include an information that is required to properly interpret the information within a track object 909 and data object 811 as shown in FIG. 9. Additionally, header object 807 can specify the overall object type for data format 805.

Data format 805 further comprises at least one track object 809. At least one track object 809 can include a plurality of parameters such as a size 911, a track type 913, a track profile 915, a DRM Information 917, a track playback rules 919, a data object pointer 921 and a data 923. In an embodiment of the invention, size 916 denotes a total size of track object 809. Track type 913 describes a type of track. Type of the track can be for example a combination of a video and an audio, a combination of a video and an audio and a text, a video, an audio, a Joint Photographic Experts Group (JPEG), or a text. Track profile 915 can include parameters that describe the track, including a coding type and a length. DRM Information 917 can be a digital rights information associated with the track. Track playback rules 919 can be rules that are associated with playing the track. Track playback rules 919 can comprise rules such as a play always, a play beginning at a particular time offset, a repeat, a delete from a particular time offset range. Data object pointer 921 may point to data 923. Data 923 can be contained in data format 805 itself, or separately. Data 923 can be, for example, an actual data stream. Track object 809 describes the type of track, for example a video, an audio, or a text track that forms part of the header object 807. Typically a movie may have at least two tracks, for example a video and an audio. If the movie is separated into a plurality of data 923, it may have a plurality of video tracks and a plurality if audio tracks. The text track can be used for a closed captioning, a plurality of subtitles and a text overlay-based advertising.

The data format 805 may further comprise of a data object 811. Data object 811 can include a plurality of parameters such as a size 927, a data profile 929 and a data 931. In an embodiment of the invention, size 927 denotes the total size of data object 811. Data profile 929 can include parameters of data object 811. Data 931 can be an actual data stream.

In an embodiment of the invention, data format 805 can be in an XML (Extensible Markup Language) format, or an Abstract Syntax Notation number One (ASN.1) format. Those of skill in the art, however, will appreciate that the implementation for data format as mentioned herein is not exhaustive and could be implemented by various other formats Another embodiment of the invention may comprise data format 805 of FIG. 8 supporting a transmission of a live content over a network. The live content can refer to a digital media content, which may be recorded upon a persistent medium such as a disk, a compact disc, a digital video device.

The various embodiments of the invention provide a method and system that enable dynamic modification of metadata if any changes to a content are required during playback. The metadata is kept separate from the content, as a result it does not require cumbersome and costly re-authoring and reconstructing of the content. Further, this enables the same metadata or a set of rules to be applied to different content or different metadata to be applied to the same content. The metadata can therefore enable addition of elements that can be useful in a redundant deployment such as advertising and message insertion, including the ability to provide a text over video overlays during a playback of the content.

Those skilled in the art will appreciate that the disclosure overcomes the limitations as stated above with respect to static descriptions of a content, which require the content to be completely re-authored if any changes to the content are required during playback. In addition, the content description format is tied to the content itself. The uniqueness of the invention lies in its dynamic mechanism in a way the content such as a movie, a video and an online content can be viewed.

What is claimed is:

1. A computer implemented method using a processor to enable dynamic modification of a content at a receiving end, the method comprising:
   A) constructing at a transmitting end a first content;
   B) determining at the transmitting end a first set of rules based on a first criterion;
   C) transmitting the first set of rules and the first content separately from the transmitting end to the receiving end;
   D) authoring the content at the receiving end by applying the first set of rules to the first content;
   E) performing at the transmitting end one of constructing a second content and determining a second set of rules based on a second criterion;
   F) transmitting from the transmitting end to the receiving end one of the second content and the second set of rules based on the second criterion;
   G) dynamically modifying the content at the receiving end by using the processor to one of applying the second set of rules to the first content and applying the first set of rules to the second content.

2. The computer implemented method of claim 1, wherein a step of constructing the first content in step A includes a step of receiving a first content data from one of a video production house, a film production house, a site management company, and a television channel.

3. The computer implemented method of claim 1, wherein the first content in step A comprises a movie, a video, a viewable online content, a television series, a documentary, and a game.

4. The computer implemented method of claim 1, wherein the first criterion in step B comprises a region information to which region the first content is transmitted, and a viewing pattern information of a viewer.

5. The computer implemented method of claim 1, wherein the first set of rules in step B comprises a plurality of advertisements, a plurality of subtitles, a plurality of holograms and a plurality of censor rules.

6. The computer implemented method of claim 5, wherein the first set of rules in step B is formatted using a data format, the data format comprising:
   at least one track object comprising a video, an audio, a text, or a JPEG (Joint Photographic Experts Group.

7. The computer implemented method of claim 6, wherein the first set of rules in step B is formatted using a data format, the data format comprising:
   at least one header object, the header object comprising a header information required to interpret the track object.

8. The computer implemented method of claim 7, wherein the data format further comprises a data object, the data object comprising a video stream, an audio stream or a text stream.

9. A computer implemented method using a processor for dynamic modification of metadata in a content at a receiving end, the method comprising:
- A) receiving at the receiving end a first content and a first set of rules transmitted separately from the transmitting end;
- B) authoring the metadata of the content at the receiving end by applying the first set of rules to the first content; and
- C) receiving at the receiving end one of a second content and a second set of rules transmitted from the transmitting end;
- D) using the processor to dynamically modify the metadata of the content at the receiver end by applying one of the first set of rules to the second content and the second set of rule to the first content.

* * * * *